United States Patent
Hodges

(10) Patent No.: US 9,911,103 B2
(45) Date of Patent: Mar. 6, 2018

(54) PAYMENT GATEWAY FOR PROCESSING PAYMENT REQUESTS ASSOCIATED WITH A WIRELESS USERS ACCOUNT

(75) Inventor: Richard Lance Hodges, Tampa, FL (US)

(73) Assignee: SYNIVERSE TECHNOLOGIES, LLC, Tampa, FL (US)

(*) Notice: Subject to any disclaimer, the term of this patent is extended or adjusted under 35 U.S.C. 154(b) by 890 days.

(21) Appl. No.: 12/904,217

(22) Filed: Oct. 14, 2010

(65) Prior Publication Data
US 2012/0095905 A1  Apr. 19, 2012

(51) Int. Cl.
*G06Q 40/00* (2012.01)
*G06Q 20/02* (2012.01)
(Continued)

(52) U.S. Cl.
CPC .......... *G06Q 20/027* (2013.01); *G06Q 20/10* (2013.01); *G06Q 20/28* (2013.01);
(Continued)

(58) Field of Classification Search
CPC ........ H04W 8/183; H04W 4/14; H04W 4/12; H04W 12/06; H04W 92/02; H04W 88/06; G06Q 20/04; G06Q 20/20; G06Q 20/32; G06Q 20/237; G06Q 30/04; G06Q 40/00
USPC ..... 705/34, 35, 38, 39, 40, 41, 42, 44, 26.1, 705/14.73; 455/466, 433, 411, 558, 410; 370/328; 380/270
See application file for complete search history.

(56) References Cited

U.S. PATENT DOCUMENTS 6,205,327 B1 * 3/2001 Sentinelli ...................... 455/407
7,995,994 B2 * 8/2011 Khetawat ................ H04M 3/16
455/410
(Continued)

FOREIGN PATENT DOCUMENTS

KR  2007/0121618 A  12/2007
KR  2008/0009671 A  1/2008
(Continued)

OTHER PUBLICATIONS

McCarthy, Caroline, "Verifone, Paypal Dial Up Mobile Payments Deal" October 26, 2010, CNET News, The Social.*
(Continued)

*Primary Examiner* — Kelly Campen
(74) *Attorney, Agent, or Firm* — Alston & Bird LLP

(57) ABSTRACT

A Payment Gateway interfaces, in one embodiment, with a merchant's website or a payment aggregator used by the merchant's website, for facilitating purchases made at the website by a wireless user. In one embodiment, purchases at the website are paid for by charging the wireless user's prepaid account maintained in the mobile operator. The Payment Gateway accepts messages in an HTTP based message from the website or payment aggregator and provides a gateway function to the wireless user's service provider, which is accessible only using SS7 based MAP protocols. The mobile gateway ascertains the proper message syntax to use in a MAP based USSD message based on the wireless carrier. The mobile gateway also receives messages from the mobile operator, typically using a GSM MAP based protocol and initiates HTTP based messages back to the merchant's website.

19 Claims, 10 Drawing Sheets

(51) Int. Cl.
 *G06Q 20/10* (2012.01)
 *G06Q 20/28* (2012.01)
 *G06Q 20/32* (2012.01)
 *H04M 15/00* (2006.01)
 *H04W 4/24* (2018.01)
 *H04M 15/06* (2006.01)

(52) U.S. Cl.
 CPC ........ *G06Q 20/3221* (2013.01); *H04M 15/00* (2013.01); *H04M 15/06* (2013.01); *H04M 15/43* (2013.01); *H04M 15/47* (2013.01); *H04M 15/48* (2013.01); *H04M 15/68* (2013.01); *H04M 15/8038* (2013.01); *H04W 4/24* (2013.01); *H04M 2215/2026* (2013.01)

(56) References Cited

U.S. PATENT DOCUMENTS

| | | | | |
|---|---|---|---|---|
| 8,699,994 | B2* | 4/2014 | Kim | G06Q 30/0601 455/406 |
| 8,958,772 | B2* | 2/2015 | Kim | G06Q 30/0601 455/406 |
| 9,723,131 | B1* | 8/2017 | Ramalingam | H04M 1/72569 |
| 9,799,021 | B1* | 10/2017 | Lee | G06Q 20/20 |
| 2003/0073440 | A1* | 4/2003 | Mukherjee | H04L 29/06 455/435.1 |
| 2005/0070278 | A1* | 3/2005 | Jiang | H04W 8/183 455/432.3 |
| 2005/0228720 | A1* | 10/2005 | Pavlic | G06Q 20/04 705/16 |
| 2010/0293065 | A1 | 11/2010 | Brody et al. | |
| 2011/0047045 | A1 | 2/2011 | Brody et al. | |

FOREIGN PATENT DOCUMENTS

| | | | | |
|---|---|---|---|---|
| WO | WO 9705729 A1 | * | 2/1997 | ............. G06Q 20/32 |
| WO | WO 0248974 A1 | * | 6/2002 | ........... G06Q 20/341 |
| WO | WO 2002048974 A1 | * | 6/2002 | |
| WO | WO 2006001723 A1 | * | 1/2006 | ............. G06Q 20/20 |
| WO | WO 2011/019365 A2 | | 2/2011 | |
| WO | WO 2011/062641 A2 | | 5/2011 | |

OTHER PUBLICATIONS

McCarthy, VeriFone, PayPal Dial Up Mobile Payments Deal, Retrieved Oct. 26, 2010 from Internet Site http://news.cnet.com/8301-13577_3-20020700-36.html?tag=cnetRiver#ixzz13UIap6mb, 4 pages total, Cnet News.

* cited by examiner

PAYMENT GATEWAY FOR PROCESSING PAYMENT REQUESTS ASSOCIATED WITH A WIRELESS USERS ACCOUNT

BACKGROUND OF THE INVENTION

Field of Invention

The present invention is generally directed to mobile payments, and more specifically directed to a gateway for processing purchase requests typically originating from a website serving a mobile user for debiting an account associated with the wireless user, where the account is maintained by a mobile operator.

Prior Art

The use of a computer connected via the Internet allowing a user to purchase goods and services from a website has been known for some time. The growing proliferation of mobile devices, such as mobile phones, "smart phones," wirelessly connected tablets, and other such devices, offers an additional level of convenience for users desiring to purchase goods and services on-line. Hence, it is not surprising that such mobile devices are often used for accessing websites for purchasing goods and services. Individuals frequently carry their mobile phone with them, so that they typically possess it when they are "out and about" and thus it can provide a ready mechanism for purchasing items. Further, some vendors only have a "virtual" presence, e.g., a website for providing goods and services. For example, downloading a ringtone may only be available to a customer accessing a website to obtain the ringtone. There is no mail-order access or a "brick and mortar" store for a customer to purchase the ringtone.

When using a mobile device for making purchases, an electronic payment method of some form is used. In some cases, this may involve using a credit card or debit card. However, even using a credit or debit card still requires the person to carry a wallet, which is inconvenient in some instances. Alternatively, the user can memorize their credit card/debit account numbers, but most people do not readily know this information. Consequently, if they do not have the credit card, they cannot purchase the item at the website. Further, while many potential purchasers may have a credit/debit card, many other individuals do not. For a number of reasons, individuals may not have, may not qualify, or may not choose to use a credit/debit card. These types of individuals are sometimes referred to as "unbanked" users. Merchants limiting their customer base to only those customers having a credit or debit cards are excluding a large customer base of unbanked users. Many unbanked users would like to make purchases, and often would like to use their mobile phones to do so.

Wireless carriers (a.k.a. wireless service providers, wireless operators, mobile network operators or mobile operators) presently maintain and perform identification and security for mobile devices, and this capability can be used to facilitate security for purchase of wireless services from the mobile user. In this scenario, existing methods used by the wireless carrier for ensuring identification and verification of the mobile device can be relied upon. For example, when downloading a ring-tone from a wireless carrier, the wireless carrier will know the identity of the mobile phone device, the telephone number associated with the phone, and associated account information of the user of the mobile phone. The carrier thus knows whether the mobile device is authenticated and whether the user is in good standing. However, this arrangement presumes that the carrier is the merchant. If the merchant is not the carrier, then this information is not known by the merchant.

Wireless carriers also maintain an account of some sort for their users. This can be a "post-paid" account (e.g., invoiced and billed on a monthly basis after service has been used) or a "pre-paid" account (paid in advance prior to use of the service). Post-paid users are typically referred to as "subscribers" since they have established a commitment for wireless service, typically for a specified term. Pre-paid users are typically not referred to as "subscribers," since they have no time commitment, and are often simply referred to as "pre-paid users." In this invention, "users" without qualification, refers to any type of user (post-paid or pre-paid).

In a pre-paid mobile phone environment, the user arranges for a sum of money to be credited to a pre-paid mobile phone account, which is debited as calls are made. When the pre-paid user roams on another wireless carrier's network, signaling mechanisms may be used so the wireless network serving the roaming pre-paid user may query the user's home wireless network provider to determine the availability of credit associated with the pre-paid users so that communication services can be provided, and to debit the user's account for services rendered in real time. A wireless network serving a roaming pre-paid user would likely not extend service to the user if user has an account of zero, and there was no possibility of compensation. Thus, there are signaling mechanisms to verify the account status of a pre-paid user by a remote serving network.

This type of infrastructure could be adapted for facilitating wireless purchases by a mobile phone user. Specifically, unbanked wireless customers could use their wireless pre-paid account to pay for purchases. Providing this capability requires appropriately defined systems for processing such requests. Specifically, systems and methods are needed for processing requests from the websites selling the goods for debiting accounts and allowing the website to be reimbursed from a mobile operator managing the account.

BRIEF SUMMARY OF THE INVENTION

In one embodiment, a gateway system for processes payment related requests associated with a wireless user further comprising a processor configured to perform the steps of:

a) receive at a first interface from a source a first charge request message requesting a charge operation to an account associated with a wireless user, said first charge request message comprising a first HTTP formatted message comprising an identifier associated with said wireless user and a charge amount;

b) generate at a second interface to a mobile operator a first GSM based request message comprising a first Unstructured Supplementary Service Data ("USSD") message requesting said charge operation and indicating said charge amount, said first GSM based request message comprising an International Mobile Subscriber Identity ("IMSI") associated with said wireless user;

c) receive at said second interface a first GSM based response message comprising a second USSD message received in response to said first GSM based request message, wherein said first GSM based response message confirms said charge to said account by said mobile operator; and d) generate at said first interface a first charge response message to said source comprising a second HTTP formatted message confirming said charge to said account by said mobile operator.

In another embodiment of the invention, a method comprises processing payment related requests associated with a wireless user comprising the steps of:
a) receive at a processor from a first interface from a source a first charge request message requesting a charge operation to an account associated with a wireless user, said first charge request message comprising a first HTTP formatted message comprising both an identifier associated with said wireless user and a charge amount;
b) generate by said processor at a second interface to a mobile operator a first GSM based request message comprising a first Unstructured Supplementary Service Data ("USSD") message requesting said charge operation and indicating said charge amount, said first GSM based request message comprising an International Mobile Subscriber Identity ("IMSI") associated with said wireless user;
c) receive by said processor at said second interface a first GSM based response message comprising a second USSD message received in response to said first GSM based request message, wherein said first GSM based response message confirms said charge to said account by said mobile operator; and
d) generate by said processor at said first interface a first charge response message to said source comprising a second HTTP formatted message confirming said charge to said account by said mobile operator.

Other embodiments are disclosed herein and the above summary is not intended to limit the scope of the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
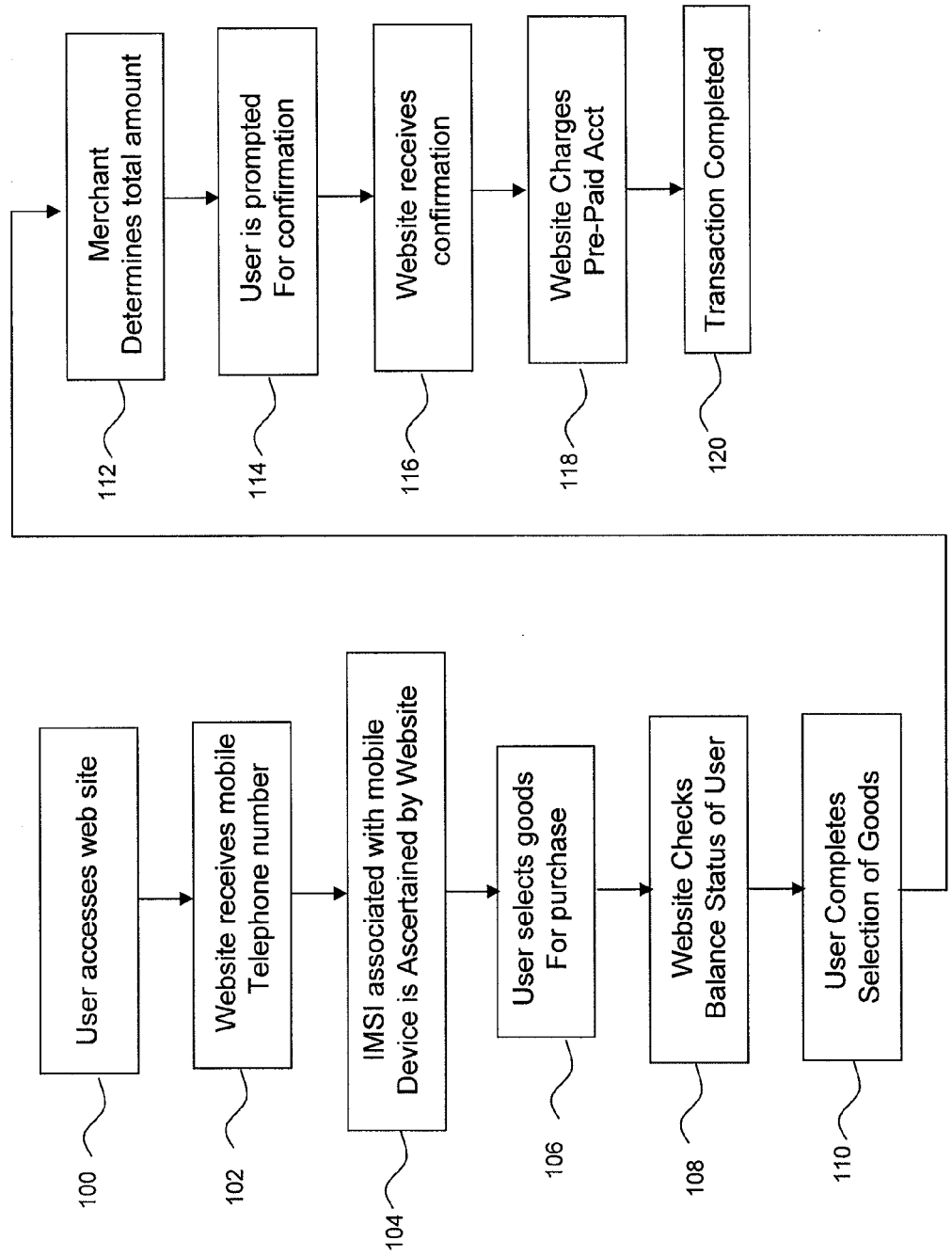
FIG. 1 illustrates a process flow of one embodiment in the Payment Gateway for processing requests.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Although certain methods, apparatus, systems, and articles of manufacture have been described herein, the scope of coverage of this patent is not limited thereto. To the contrary, various embodiments encompass various apparatus, systems, and articles of manufacture fairly falling within the scope of the appended claims either literally or under the doctrine of equivalents.

As should be appreciated, the embodiments may be implemented in various ways, including as methods, apparatus, systems, or computer program products. Accordingly, the embodiments may take the form of an entirely hardware embodiment or an embodiment in which computing hardware, such as a processor or other special purpose devices, is programmed to perform certain steps. Furthermore, the various implementations may take the form of a computer program product on a computer-readable storage medium having computer-readable program instructions embodied in the storage medium. Any suitable computer-readable storage medium may be utilized including, but not limited to: technology based on hard disks, CD-ROMs, optical storage devices, solid state storage or magnetic storage devices.

The embodiments are described below with reference to block diagrams and flowchart illustrations of methods performed using computer hardware, apparatus, systems, and computer-readable program products. It should be understood that the block diagrams and flowchart illustrations, respectively, may be implemented in part by a processor executing computer-readable program instructions, e.g., as logical steps or operations executing on a processor in a computing system or other computing hardware components. These computer-readable program instructions are loaded onto a computer, such as a special purpose computer or other programmable data processing apparatus, to produce a specifically-configured machine, such that the instructions which execute on the computer or other programmable data processing apparatus implement the functions specified in the flowchart block or blocks.

Service Overview

A typical application for the present invention involves a wireless user requesting a purchase at a website where the purchase is paid for using the user's wireless pre-paid account. For purposes of illustration and not for limitation, a wireless user may be using a mobile device to purchase a song from a website, a ringtone or download a software application to their mobile phone, such as a game. In other embodiments, the user (e.g., the same person as the wireless user) may be completing a purchase using a wireline connected personal computer to access the website. Thus, the user does not necessarily have to use wireless technology to complete the transaction. It should be appreciated that many variations are possible as to what is purchased and how the goods/services are provided. Thus, it is possible to practice the invention by purchasing other types of goods and services. Further, although the principles of the invention are illustrated using a pre-paid wireless user, other embodiments of the invention can be applied to post-paid users. For simplicity, the reference is made to the user purchasing "goods," and this does not necessarily exclude "services." Thus, unless stated otherwise, the scope of these terms are commensurate.

The process of purchasing the product is shown in FIG. 1. In FIG. 1, in step 100, the user accesses a website for purchasing the product using a mobile browser. It is not required in all embodiments that a website browser on a mobile phone is used. In other embodiments, the users can dial a telephone number and interact with an interactive voice response unit. In other embodiments, the user may dial a number where they speak with an operator. In other embodiments, other forms of communication may be used, such as "texting" (short message service). However, it is expected that in most embodiments interaction with a website will occur using a personal computer or a mobile device for conducting the transaction. In this example, it is presumed that the user has completed any registration required by the website prior to purchasing of goods (which is operated by the seller of the goods or services).

At step 102, the website receives a mobile telephone number of the user. The provision of the mobile telephone number may occur by direct action by the user. The user can explicitly provide the mobile telephone number via keypad entry at the website. Depending on the particular embodiment, the website of the vendor may already know the mobile number by means of "cookies" that associate the device with a user profile. In other embodiments, the user may have to re-enter the information and provide other security information at the website.

The mobile telephone number is also known as the Mobile Subscriber Integrated Services Digital Network Number or "MSISDN." The MSISDN number identifies the subscriber to the wireless provider and is sufficient for routing a telephone call. However, the MSISDN by itself does not necessarily inform an external entity which mobile carrier (mobile operator) is the home carrier of the wireless user, or the country in which that carrier is operating. For example, a number such as 404-555-1212 is recognized as conforming to the North America Numbering Plan, but it does not necessarily indicate whether this number is a wireless number, nor if it is a wireless number, which carrier it is associated with. To further identify the carrier and country unambiguously, a unique number, International Mobile Subscriber Identity or "IMSI" is used. The IMSI is composed of the Mobile Country Code ("MCC"), a Mobile Network Code ("MNC") and a Mobile Station Identification Number or "MSIN". The MNC can be thought of as a wireless carrier identifier. Thus, knowing the MCC, the MNC, and the MSIN allows unique identification of the subscriber as well as the home carrier. This combination is called the IMSI (International Mobile Subscriber Identity). Further, the IMSI is typically used by wireless carriers to identify a subscriber. Thus, databases of subscriber information may be indexed using the IMSI. In the North American telephone numbering plan, the telephone number itself can be easily ascertained as a U.S. domestic telephone number by examining the area code, but the telephone number itself does not indicate which mobile operator ("carrier") is serving the user.

As is well known in GSM, the IMSI is programmed in the Subscriber Identity Module (SIM) chip, which can be removed and used in various mobile devices. This facilitates replacement/upgrading of the mobile device, if the user so desires. As noted, the IMSI can be used to identify the carrier. Since the invention relies on using the pre-paid account of the wireless user to pay for goods purchased, it is now evident why the IMSI, and not merely the MSISDN is required to be known. As noted, the MSISDN is not sufficient to identify the carrier, and hence the appropriate account cannot be identified.

Returning back to FIG. 1 and to recap, in step 104 the IMSI value associated with the user has been determined. Determining the IMSI value may occur while the user is browsing and selecting items to purchase as shown in step 106. Typically, the process of determining the IMSI is not discernable to the user.

The next few steps may occur in different order, and the following illustrates one embodiment. In step 106 the user selects goods for purchase. In one embodiment, this may involve selecting a game application to download to the user's mobile phone. The selection of goods may occur in a conventional manner. At this point, it is presumed that the web site knows the ISMI of the user, and an initial estimate of the goods that are expected to be sold.

The website can then check the balance status of the user in step 108. The IMSI allows the request to be transmitted from a gateway through the existing SS7 signaling infrastructure to the home wireless carrier. This allows the website to indirectly communicate with the appropriate HLR of the home wireless carrier. The balance status query can be used by the website to ascertain whether the user is able to pay for the goods using the pre-paid account. In some embodiments, the website may perform multiple balance queries, including a query after each good is selected by the user. In other embodiments, only a single query is made. This allows the website to ascertain whether each selected item (as each item is selected) can be paid for using the pre-paid account. In still other embodiments, the website may indicate to the user the credit amount that is available, so that the user will know whether certain items can even be selected. In other embodiments, the website may perform a balance query as soon as the IMSI is known, prior to the user selecting goods to purchase.

In step 110, the user completes selection of the goods. Again, selection of goods may use conventional procedures including a "check out" procedure. Upon "check out," a subtotal of the goods can be determined by the website, and this total amount can be the basis for performing a balance query. Essentially, by checking the balance status, a credit level can be ascertained. If the sum of the goods selected for purchase exceeds the available balance, the website can then inform the user at that point of the status. If the sum of the goods selected for purchase is less than the available balance, then the checkout procedure can proceed.

After the completion of the selection of goods in step 110, the website will compute any additional costs, including handling, taxes, shipping, etc. or discounts as appropriate in step 112. Once the final total is known, the user may be asked to confirm the total amount that will be deducted from their pre-paid account in step 114. This can be accomplished by causing the display of the phone to visually indicate the total amount and request that the user confirm the amount to be charged. Confirmation is received at the website in step 116. It is noted that the request of confirmation and receipt of confirmation may not always be communicated directly between the website and the user's mobile device in all embodiments. In some embodiments, the request and receipt of confirmation may involve communication between the user's device and the Payment Gateway.

Once confirmation is received in step 116, the website initiates the charge against the pre-paid account in step 118. Upon confirmation of the charge, the transaction is completed in step 120. The website may confirm that the transaction is completed with the user.

After the transaction, the user can verify the account balance in their pre-paid account. For example, some wireless service providers provide this service using a form of instant messaging. In some embodiments, users may enter a defined code, such as "*123#" followed by pressing "send" to check their pre-paid balance. After the user has made a purchase, checking the balance of the account would reflect the prior balance value decremented by the amount of the purchase value.

Figure 2:
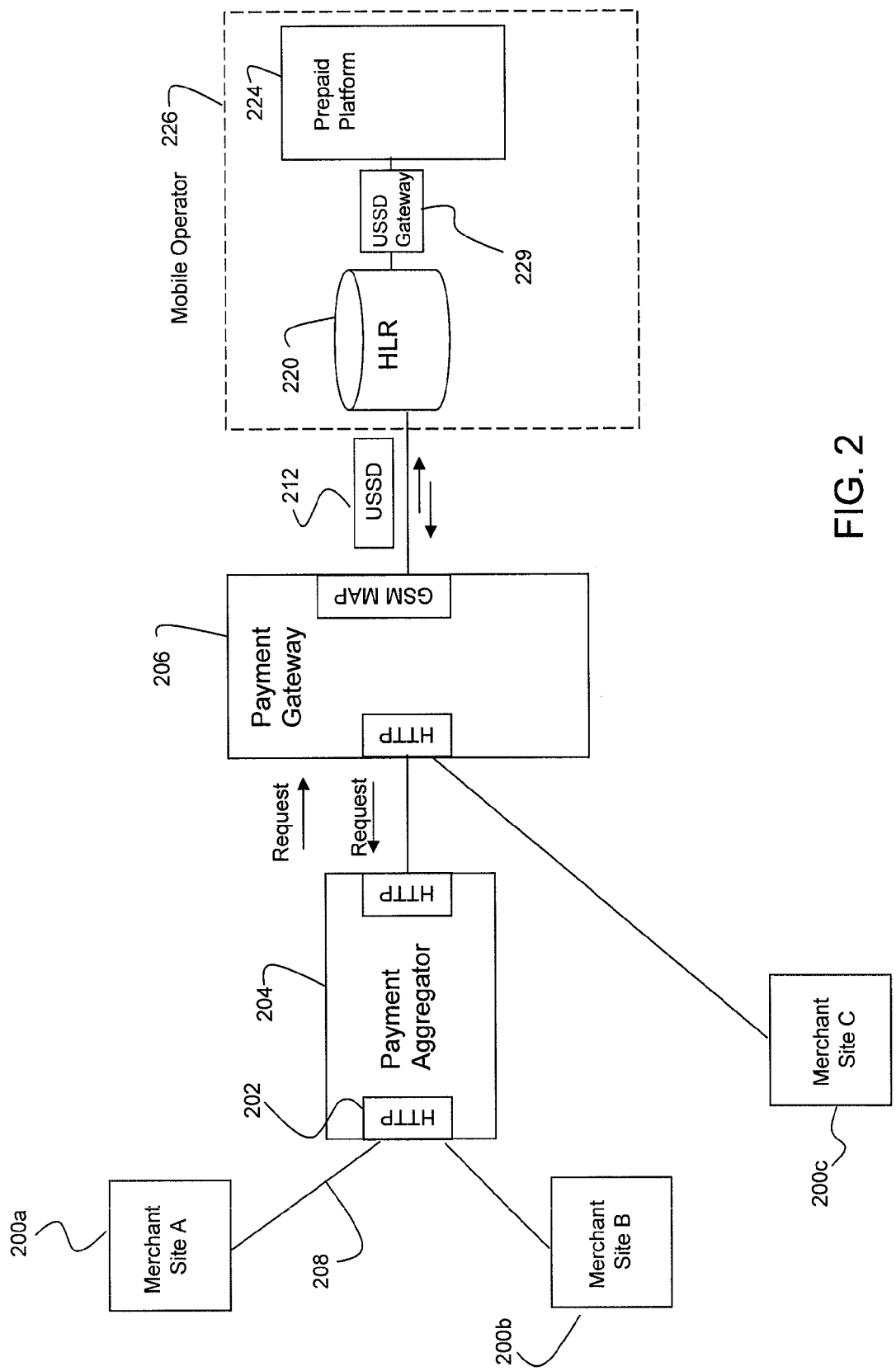
FIG. 2 illustrates one embodiment of a system architecture for using a Payment Gateway.

The above process describes one embodiment of the interaction involving the user and the merchant's website. Variations on the process are possible. However, generally speaking, it is necessary to know which mobile carrier is associated with the user, and because wireless carriers identify their pre-paid account using the ISMI, the ISMI of the user must be ascertained by the website prior to requesting the wireless carrier to charge the user's wireless account. Once the amount is determined, the website may then request the charge to the wireless user's account System Architecture One embodiment of the system architecture of the present invention is shown in FIG. 2. In FIG. 2, various merchant (web) sites executing in web servers 200a-200c are shown. The wireless user (not shown) can access and interact with the website in one embodiment using a mobile browser in a conventional manner, from a desktop, or in other ways as known to one skilled in the art. The web servers 200a and 200b communicate in this embodiment using conventional data communication facilities 208 to an HTTP based interface of a Payment Aggregator 204. Other types of facilities and protocols may be used in other embodiments. In some embodiments, the merchant's web set may utilize a payment aggregator to facilitate aggregation of payment requests. It is possible that the merchant site may accept a variety of form of payments (e.g., credit card, debit card, debiting the wireless users' pre-paid account), and may rely on a payment aggregator to carry out the different payment forms, use the payment aggregator or address a specific payment form, such as debiting a pre-paid account associated with the wireless user. In other embodiments, the website merchant server 200c can interface directly to an HTTP interface on the Payment Gateway 206 for transactions involving charges to the wireless user's pre-paid account. If the Payment Aggregator 204 is used, then it typically would interface using HTTP based communication protocols to the Payment Gateway 206. Interactions with the Payment Gateway would be limited to debiting a wireless account associated with the mobile user.

The communication between the merchant sites (or the payment aggregator) and the Payment Gateway typically, but not necessarily, uses HTTP based communication. Thus, typically, HTTP requests and HTTP responses originate and are recognized by the merchant website. For example, HTTP "GET" or "POST" based messages can be used. Other protocols and message formats can be used as well.

The Payment Gateway provides various functions, including protocol reformatting from the HTTP based communication with the merchant websites to a protocol used by the mobile operator. Typically, the communication protocol between the Payment Gateway 206 and the mobile operator 226 is based on the GSM standard, and a sub-portion known as MAP (Mobile Application Part). The GSM signaling architecture uses SS7-based facilities, and is not readily available for interfacing via the Internet. In other embodiments, the GSM signaling architecture may be based on other types of signaling interfaces, such as C7. The example that follows illustrates the invention in terms of using SS7 signaling, but those skilled in the art will recognize that that this represents only one embodiment of the invention. SS7 traditionally is regulated and not "open" in the same context as Internet traffic. In various embodiments, different message formats can be used between the merchant site and the Payment Gateway ("gateway"). Further, different messages could be used on the SS7 side of the gateway. However, for purposes of illustration, various GSM messages are used. One such message is the MAP-SEND-ROUTING-INFO-FOR-SM message which returns the current IMSI of the user. This is a "Send Routing Information" message which is a GSM MAP message. Another message, MAP_PROCESS_UNSTRUCTURED_SS_REQUEST, the "USSD" MAP message, is used to illustrate the concept of the present invention. USSD is "Unstructured Supplementary Service Data" which allows unstructured data to be conveyed from the mobile phone to an application in the mobile network. The contents are unstructured in that the MAP standard does not define the message structure of the contents. As a consequence, the contents of the USSD message are not standardized as to what function is being conveyed. Thus, each mobile operator 226 can define a message structure and associated semantics for use with the USSD message. For example, some mobile operators define the contents of a USSD message as "*123#" for requesting prepaid balance from a user. This provides a user with the ability to know what their current balance is for their pre-paid account. Typically, the remaining value is displayed as a remaining time or monetary value on the mobile phone's display in response to the query.

The USSD message is limited in capacity (140 bytes), which is sufficient to illustrate one embodiment of the invention. The USSD messages are generated and received by the Payment Gateway with the wireless operator without any incurring any store-and-forward delay that is associated with other GSM messages, such as short message service. In other words, USSD messages are passed without delay by the infrastructure, unlike short messages (such as MAP-MO-FORWARD-SHORT-MESSAGE) which may briefly be stored. Thus, USSD provides faster transmission of information, which is better suited for facilitating the on-line purchase transaction portion. Various SS7 infrastructure components, such as Signal Transfer Points (STPs) (not shown) may be used to transfer the MAP-SEND-ROUTING-INFO-FOR-SM and USSD based MAP messages.

Because each mobile network operator may define the contents of the USSD message distinctly for performing similar functions, the USSD messages are structured by the gateway to conform with the syntax defined by the mobile operator. Thus, the gateway needs to maintain mapping information as to the proper format of the USSD contents to use for each wireless carrier. In one embodiment, the gateway maintains a table mapping identifying a particular structure of the contents (e.g., message syntax) that is recognized by the mobile carrier. Thus, one mobile carrier may use "*123#" for balance query and another mobile carrier may use "*125#" for the same function. Thus, the gateway can lookup the IMSI (specifically the mobile network code) to determine the appropriate syntax used for that mobile carrier. The syntax can be indicated by an index associated with the particular wireless carrier that can in turn point to a table of protocol structures and functions. Alternately, the table entry value can indicate a particular data string stored for a desire function. Other approaches can be defined by one skilled in the art. This can be accomplished by various means, including lookup tables, linked lists, etc.

The mobile operator 226 typically receives the message at an HLR 220, which analyzes the contents. If it is a USSD message, the HLR may forward the USSD message based on the contents to the pre-paid platform 224, or may reformat the message and query the pre-paid platform 224 using a proprietary protocol. In some embodiments, a USSD gateway 229 may reformat the message between the HLR and the pre-paid platform. Either approach can accomplish the same function. The pre-paid platform will respond indicating a value of the balance or confirmation of a charge, or if an error condition occurred, information detailing the error condition. For a balance query, the response will indicate a balance, and the HLR will provide a USSD response message 212 back to the Payment Gateway 206 in response to the balance query. The Payment Gateway 206 will then reformat the message into an HTTP response message back to the appropriate payment aggregator. In this manner, the merchant site 200 can initiate communications with an application resident in the wireless operator (typically located in the pre-paid platform) serving the pre-paid wireless customer that the merchant site otherwise would not be able to communicate with.

IMSI Lookup Processing

Figure 3:
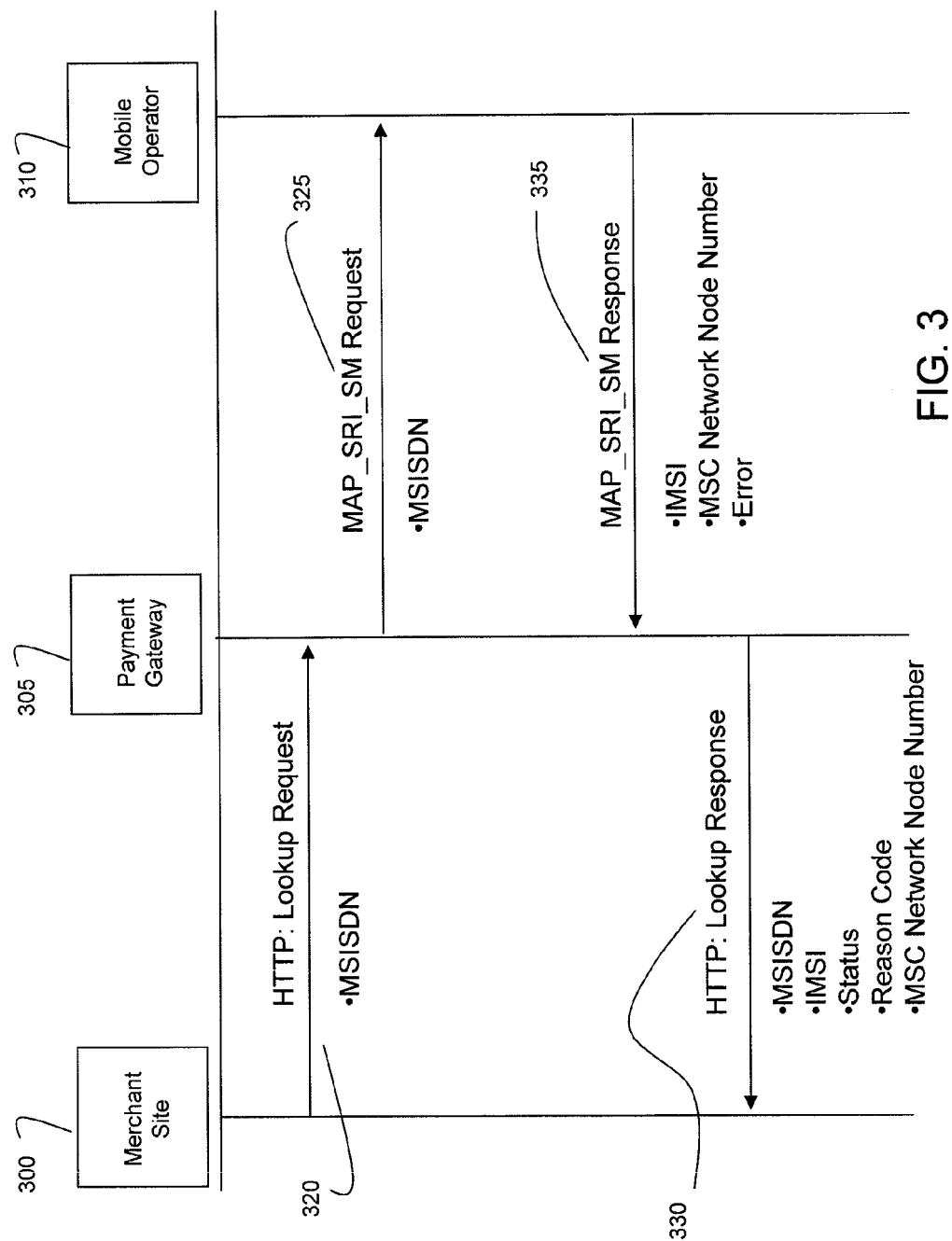
FIG. 3 illustrates one embodiment of processing IMSI lookup requests by the Payment Gateway.

The IMSI Lookup processing involves receiving an HTTP based message at the Payment Gateway that can originate either from a payment aggregator, or the merchant website and translating this to a specific MAP based message. This message requests that the mobile operator determine the IMSI and serving wireless switch of a wireless user, given the wireless user's mobile telephone number, or MSISDN. As previously indicated, the MSISDN is not sufficient to identify the mobile operator associated with the mobile user. The IMSI includes the Mobile Network Code (MNC) and Mobile Country Code (MCC), which are indicated by separate values. The MNC is used to identify the particular wireless carrier having the HLR for that wireless user. In summary, the website or payment aggregator sends an HTTP message in one embodiment indicating the MSISDN and requesting the IMSI. This is illustrated for one embodiment in FIG. 3. In FIG. 3, the merchant site 300 is shown as communicated with the Payment Gateway 305, which in turn communicates with the Mobile Operator 310. The mobile operator is shown as a single entity for illustration purposes, but includes the additional components discussed in conjunction with FIG. 2.

The HTTP message 320 is typically formatted as a "POST" or "GET" format, and includes the MSISDN parameter. For example, a POST message may be formatted as "gatewayname.com/lookup." A GET message could be formatted as "gatewayname.com/lookup?msisdn=value." Other message forms and structures could be used. The response message can provide a number of parameters delimited using a pre-defined character. For example, the response can have the parameters separated by a pipe character ("|"), comma (","), or some other delimiter which facilitates parsing of the parameters upon receipt. In one embodiment, the HTTP message uses a URL associated with the gateway, and can use an address specifically associated with the IMSI lookup function. The gateway 305 in response, structures a GSM MAP based "Send Routing Information for Short Message" ("MAP-SEND-ROUTING-INFO-FOR-SM") short message 325 having the same MSISDN parameter, and routes this using SS7 addressing techniques to the wireless provider 310. The MAP-SEND-ROUTING-INFO-FOR-SM is a defined MAP message used to return the IMSI and the number of the serving Mobile Switching Center (MSC) currently serving the user. Thus, this message can be used to request the IMSI associated with a mobile telephone number, wherein the mobile telephone number is indicated as an MSISDN. In other embodiments, other messages, such as the GSM MAP message "Any Time Interrogation" ("MAP-ANY-TIME-INTERROGATION") can be used to obtain the serving mobile switching center or VLR.

The wireless provider receives the MAP-SEND-ROUTING-INFO-FOR-SM lookup request 325, determines the appropriate IMSI value, and returns a MAP-SEND-ROUTING-INFO-FOR-SM response message 335. The response typically includes the IMSI and the serving MSC network node address. If the information cannot be provided by the wireless provider, various error codes can be returned. The exact nature of the error indications can vary in different embodiments.

The gateway 305 maps the MAP-SEND-ROUTING-INFO-FOR-SM response message 335 to an HTTP based response message 330. In certain embodiments, the HTTP response message may include the MSISDN value originally requested, the IMSI, a status indicator, reason code, and the MSC network node number (a.k.a. network node address presently serving the wireless user). In other embodiments, certain parameters (such as the IMSI, MSC network node number) are not required to be present. These parameters are typically delimited using the pipe character. The MSISDN value allows the merchant site to correlate the request with the response. Other techniques could be used to accomplish this correlation, including using a transaction value, but the MSISDN is a unique value and typically the merchant site will have a single pending request for a given MSISDN. The IMSI value is provided in the response (presuming it was provided by the wireless provider to the Payment Gateway). The status parameter indicates whether the query was successful or not. If the IMSI is provided, then the query was successful, but if the IMSI is not provided, the status indicates that the reason for failure, and can be examined for additional details. Providing a reason code in case of a failure is not required in each embodiment. However, providing this information to the merchant site allows the merchant site to detect, report, and potentially handle various error conditions in a more appropriate manner. For example, if a query for an associated MSISDN fails because of network congestion, a retry may be appropriate. If the query fails at the wireless provider because the MSISDN is an invalid value, then a retry would not be helpful. Thus, knowledge of the failure can be used by the merchant site to respond appropriately. Potential values of the reason code may include:

a. Unknown subscriber—there is no subscriber associated with the MSISDN for this carrier;

b. Teleservice not supported—the teleservice is not provisioned;

c. Call Barred—the wireless operator does not allow such messages to be received;

d. Facility not supported—the facility is not supported by the wireless operator;

e. System failure—a general indication of a problem, which may involve conveying additional parameters;

f. Data missing—required data is not present to allow the query to be completed; and g. Unexpected data value—data, such as the MSISDN, is not within the expected range or value.

In various embodiments, various other parameters may be included, and not all of the above parameters are required to be indicated. Those skilled in the art will recognize that various alternatives are possible.

Balance Request Processing

Figure 4:
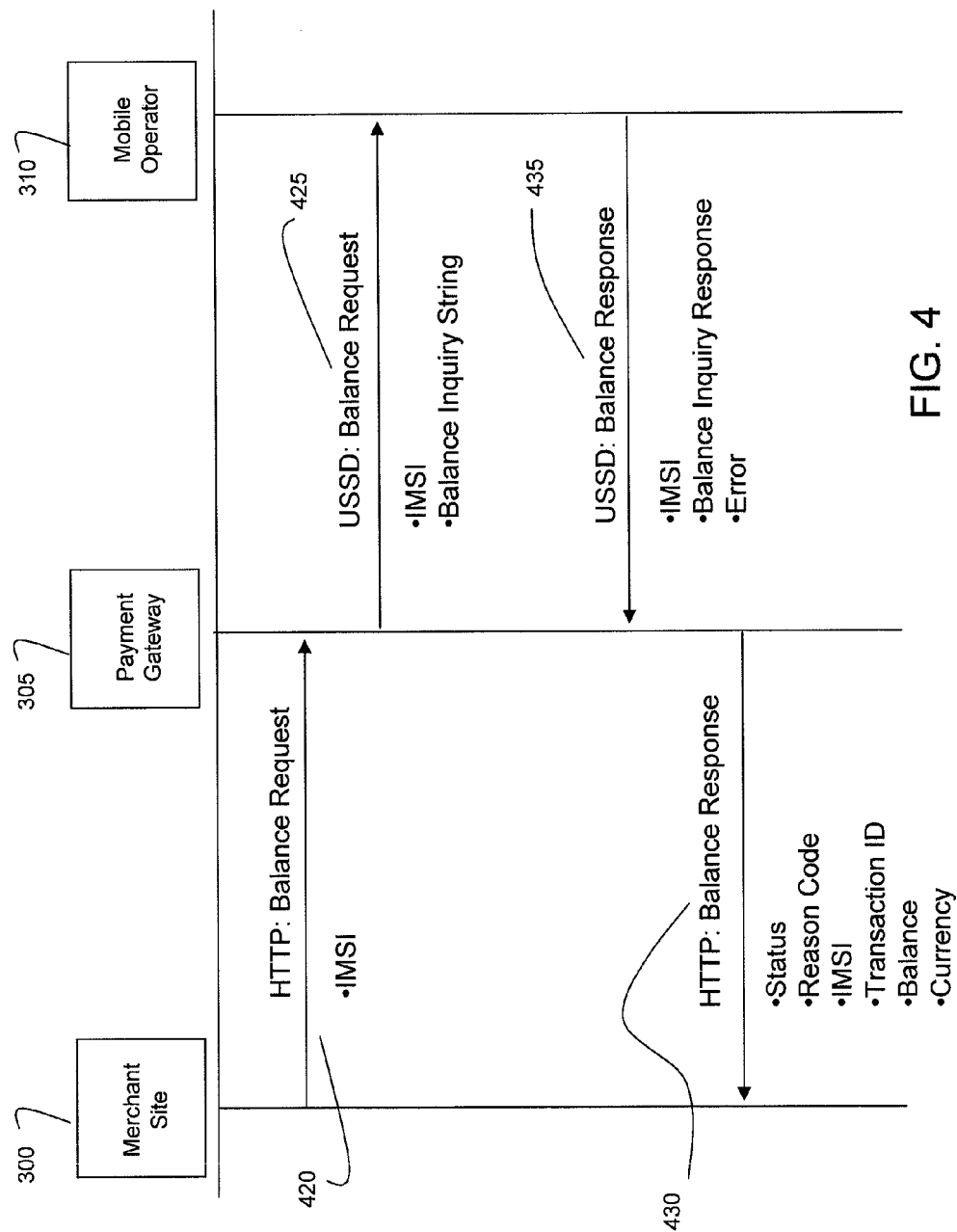
FIG. 4 illustrates one embodiment of processing balance requests by the Payment Gateway.

The balance request ascertains the current balance of a wireless user's prepaid account. The query processing is shown in FIG. 4, and also involves the gateway receiving an HTTP formatted message. However, in this case the Payment Gateway initiates an appropriately formatted USSD formatted message, receives the USSD response, and initiates an HTTP response message.

The merchant site may initiate this request at various times with respect to the overall purchase by the user. In one embodiment, the balance request is sent after the wireless user has selected the goods and is ready to checkout. In other embodiments, the merchant site may initiate a balance query as soon as the MSISDN of the user is known. For example, if the site sells ringtones for $1.00 a ringtone, and an average user typically would purchase a single ringtone, the merchant site could initiate a balance query to ascertain if the user's balance is greater than $1.00.

The merchant site initiates a HTTP query, which in one embodiment also uses the HTTP "POST" or "GET" structure. The URL address used for the balance query message can contain the same hostname or IP address as used in the IMSI lookup request; in other embodiments, the URL can be terminated on the Payment Gateway and dedicated for receiving balance queries messages. This latter approach facilitates processing in the gateway as only one type of message is expected to be processed at the gateway address.

In FIG. 4, the HTTP Balance Request message 420 is initiated by the merchant site 300 (or the payment aggregator in other embodiments). The message 420 includes the IMSI of the wireless user. Typically, the IMSI value was determined using the aforementioned IMSI lookup query. The gateway 305 receives the message 420 and in response initiates a USSD based message 425 that includes an IMSI as a parameter, a TCAP transaction ID and a string (sometimes referred to as the "balance inquiry string") that indicates the corresponding structure for the Balance Inquiry function. In some embodiments, the GSM messages convey the IMSI using TCAP based protocol messages, which can be used to convey GSM MAP messages. For purposes herein, the GSM messages may be considered as including other information conveyed using other GSM related protocols, such as TCAP. This message is routed to the mobile operator 310 using conventional SS7 routing. Because the wireless user's account information is contained at the HLR, the query is routed to the HLR.

The mobile operator 310 is able to identify the account and ascertain the present balance status. This information is returned to the gateway in a USSD message, which may include the IMSI, the TCAP transaction ID and the present balance value. TCAP transaction IDs allow the gateway 305 to correlate the response with the original request. Thus, in various embodiments, the IMSI value may or may not be present in the response messages. In many embodiments, the gateway may initiate several balance requests and have a plurality of such requests pending. Thus, TCAP transaction IDs allow the gateway to ascertain which query the response is correlated with. In certain instances, the mobile operator may not be able to return a balance. Thus, various error codes may be indicated in the response, including the aforementioned error codes. It is possible that the wireless user does not have a pre-paid account, has a suspended account, or the carrier does not support this service. Typically, either an error code (indicating failure) or the balance value is returned (indicating success).

In some embodiments, the wireless user may have a post-paid account. In such cases, the "balance" may be reflective of a credit limit, as opposed to the actual balance. In other words, in the context of a pre-paid account, the balance value indicates a maximum possible value that can be charged against the account. This can be determined by the wireless carrier by ascertaining the total credit limit of a wireless user and subtracting the accrued fees to date, resulting in an available credit balance. For example, if a wireless user is provided with a $200 total credit per month and has accrued $30 in usage fees to date for the month, then an available credit value of $170 is left for the month. Thus, a balance request would return a value of $170. In some embodiments the response may differentiate between an actual balance (pre-paid) and an available credit value (post-paid). The differentiation can be accomplished by assigning an additional status and/or reason code. However, some wireless carriers may only provide this service for pre-paid customers, and thus there is no need to provide a distinction between post-paid and pre-paid in the response message.

Depending on the embodiment, the balance value can be expressed in various units of currency. In one embodiment, the value returned may be expressed in U.S. dollars. Other embodiments may use other forms of currency, including Euros. The currency code is typically a three digit code based on the ISO 4217 international standard for identifying a particular currency.

The Payment Gateway upon receipt of the response message 435 initiates a HTTP structured message indicating a Balance response message 430. Typically, this includes a number of parameters, which can, but not necessarily include the aforementioned status code, reason code, IMSI value, balance value, transaction identifier, and currency indicator. The status code typically indicates either "success" or "failure." If the returned balance value of a pre-paid account is zero, the status code may indicate "failure," since no expected charges can be made. In other embodiments, a "failure" status code is used when other values are not able to be provided. The reason codes typically indicates one of: call barred, system failure, data missing, unexpected data value, unknown alphabet encoding, and an indicator of a post-paid account. However, other embodiments may use additional, or fewer, codes. The transaction ID is typically a numerical sequence number, which may incorporate a timestamp value, which can be used to track responses. Typically, a log may be created in the gateway and stored in memory for a limited time, along with other information, such as time, value, and IMSI. This can allow verification of a transaction by referencing the transaction identifier.

The Payment Gateway may also use a lookup table to ascertain the proper structure or string to populate in the USSD message when sending the balance query method. This lookup procedure may be used for any other types of USSD messages sent by the mobile gateway (see, e.g., "Charge Request" message processing below). Similarly, the lookup table may be used to also ascertain the appropriate syntax to use to parse the response USSD message from the mobile operator.

Charge Request Processing

The Charge Request is used to initiate the charging of an amount to the wireless account of an indicated wireless user. A response indicating this was successful means that the account of the wireless user was debited in the amount as indicated. Typically, a Charge Request message is sent by the merchant to the Payment Gateway after the wireless user has committed to make a purchase, and the total cost of the transaction is identified.

Figure 5A:
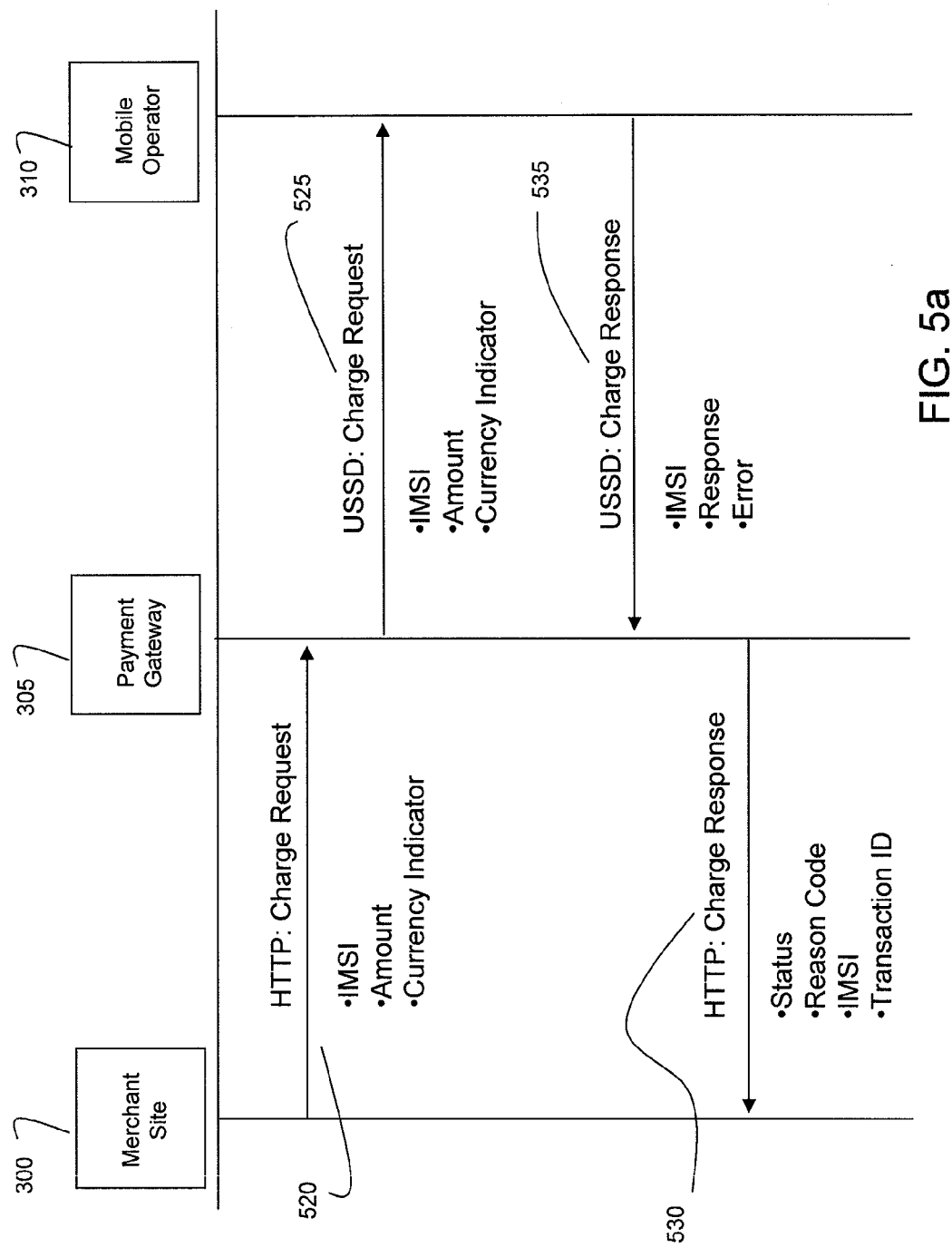
FIGS. 5a and 5b illustrate embodiments of processing charge requests by the Payment Gateway.

The process is shown in FIG. 5a and begins with the merchant site 300 initiating an HTTP based Charge Request message 520 to the Payment Gateway 305. The URL address used can contain the same hostname or IP address as for the "balance query" message, or in other embodiments, the URL can be different, and unique to the function of charging the account. If the URL is unique to providing Charge Request processing, then the parsing of the incoming messages at the gateway is facilitated. The Charge Request message 520 includes an IMSI, amount value, and a currency indicator. The IMSI was previously determined using the "IMSI Lookup" procedures, and the amount and currency indicator are the values associated with the wireless transaction being requested between the user and the merchant's website. In many embodiments, the currency indicator can default to USD unless otherwise indicated.

The Payment Gateway 305 receives the HTTP message and initiates a corresponding USSD message 525. The USSD includes a string which corresponds to the Charge Request function as defined for the mobile operator. Typically the USSD message may comprise parameters indicating the IMSI, a TCAP transaction ID, the amount, and the currency indicator. As noted before, correlation can be done with the TCAP transaction ID and/or the IMSI, so that the IMSI is not always present in all embodiments. This message is routed to the mobile operator 310 using conventional SS7 routing.

Once received by the mobile operator 310, the appropriate debit to the wireless user's account is made. If the account is a pre-paid account, then the balance available is reduced by the amount indicated. If the account is a post-paid account, then the available credit limit is reduced by the amount indicated. Typically, because a balance query was made prior to the charge request (in certain embodiments), it is expected that there are sufficient funds available for completing the charge. In some cases, an intervening charge to the wireless account may have occurred, or the merchant did not initiate a balance query, or other factors may cause the charge request to fail.

The mobile operator 310 provides a USSD structured Charge Response message 535 back to the Payment Gateway, which may include the IMSI value of the wireless user, the TCAP transaction ID, or charge response information and/or error information. In some embodiments, the response information comprises parameters including a status indicator (indicating success or failure); a reason code which indicates further information associated with a failure, and a transaction identifier. Other embodiments may further indicate the amount charged (which typically is the same as the amount requested). The particular parameters returned can vary from embodiment to embodiment, and are determined in many cases by the mobile operator.

The Payment Gateway 305, upon receipt of the USSD Charge Response message 535, initiates a HTTP structured message indicating a Charge Response 530, which is sent back to the merchant site 300. Typically, the HTTP message 530 includes similar parameters as in the other HTTP based response messages, including a status indicator indicating success or failure, a reason code, the IMSI value, and a transaction identifier assigned by the Payment Gateway. The reason code may indicate certain failure reasons which are unique to this message, including:

a. Post-Paid Account. In certain embodiments, the wireless service operator may not allow charging purchases to a post-paid account.
b. Insufficient funds. There are insufficient funds to complete the charge.
c. Charge Bar. The wireless service operator does not allow charges to be made against this particular prepaid account. This bar can be requested by the particular wireless user.
d. Other codes may be defined, and are within the scope of the present invention.

The transaction identifier may be used to track the particular transaction for future reference. While the IMSI value may be used by the website to correlate the response, the IMSI value is not sufficient to identify the transaction to the Payment Gateway. The Payment Gateway may have handled a number of such requests for a given MSISDN and hence merely referencing the MSISDN or IMSI does not provide sufficient specificity for referencing that transaction.

Figure 5B:
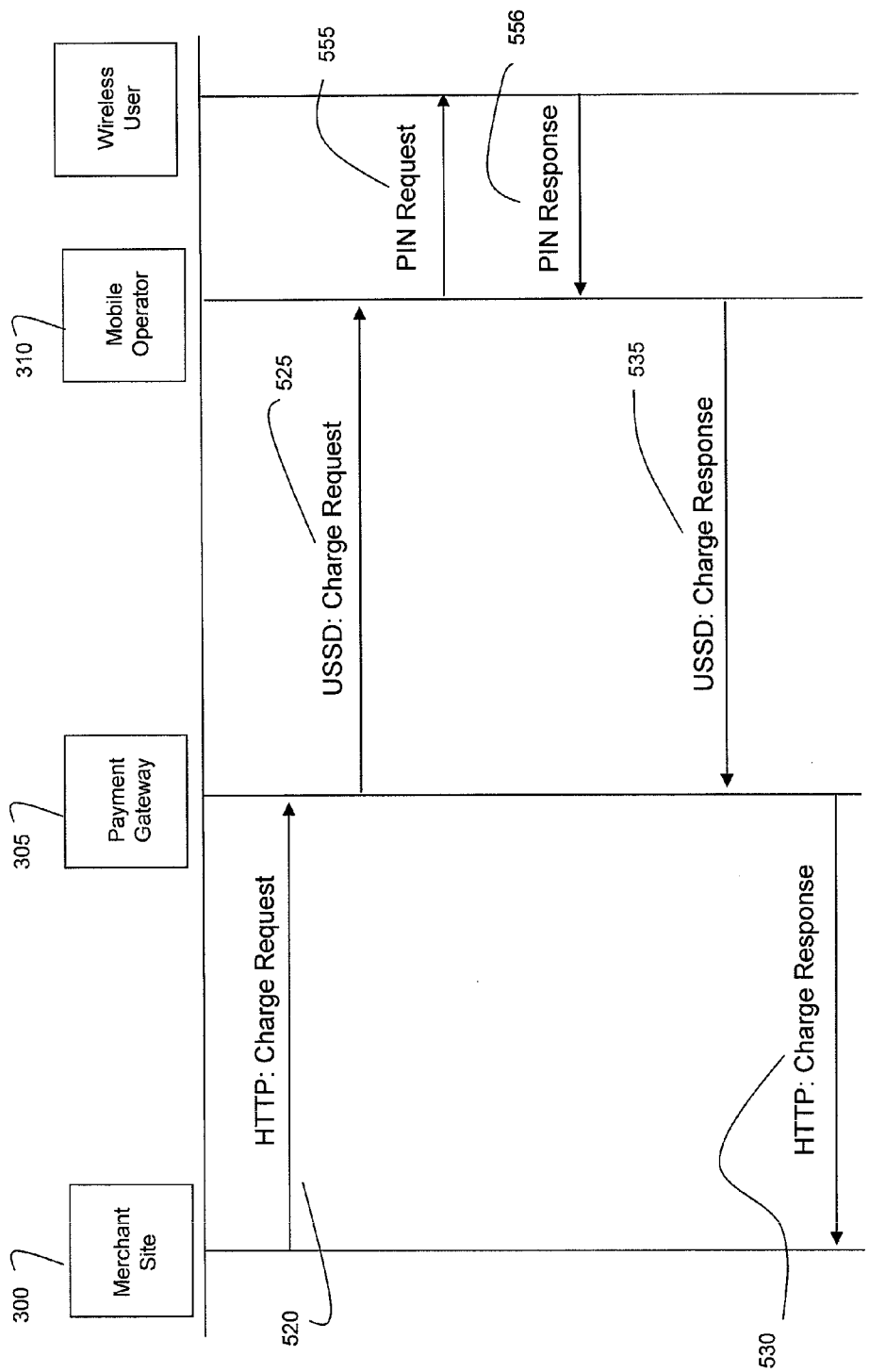

In FIG. 5b, another embodiment is illustrated where the Mobile Operator 310 initiates a PIN Request message 555 to the wireless user. The Mobile Operator may require, for security purposes, a separate confirmation from the wireless user confirming that a charge request has been initiated. The Mobile Operator may maintain security information for that wireless user in the form of a personal identification number ("PIN") or other information used for verifying the charge request was initiated from the wireless user. The PIN Request 555 can be sent using a number of communication techniques, and one common technique is to send a short message service ("SMS") message to the user confirming the purchase by entering a PIN. Upon entry of the PIN, a PIN Response message 556 is sent from the wireless user to the Mobile Operator. The Mobile Operator can verify the PIN value as a condition for returning the Charge Response message 535.

Confirming Charge

In some embodiments, a confirmation of the charge by the mobile operator with the user may be performed before the user's account is actually debited. This process is not required in all embodiments, and it can be used to provide an additional layer of fraud prevention or for other purposes. This process can be used to address the possibility that a merchant site or payment aggregator could initiate a fraudulent charge request charging an account of a wireless user that is not actually purchasing any product or service. When the wireless service operator receives a request for a charge from the gateway (which had originated from a merchant site), the wireless service operator may confirm directly with the wireless user that the charge is to occur. In some embodiments, the merchant site may request that the mobile operator confirm the charge with the user.

Figure 6:
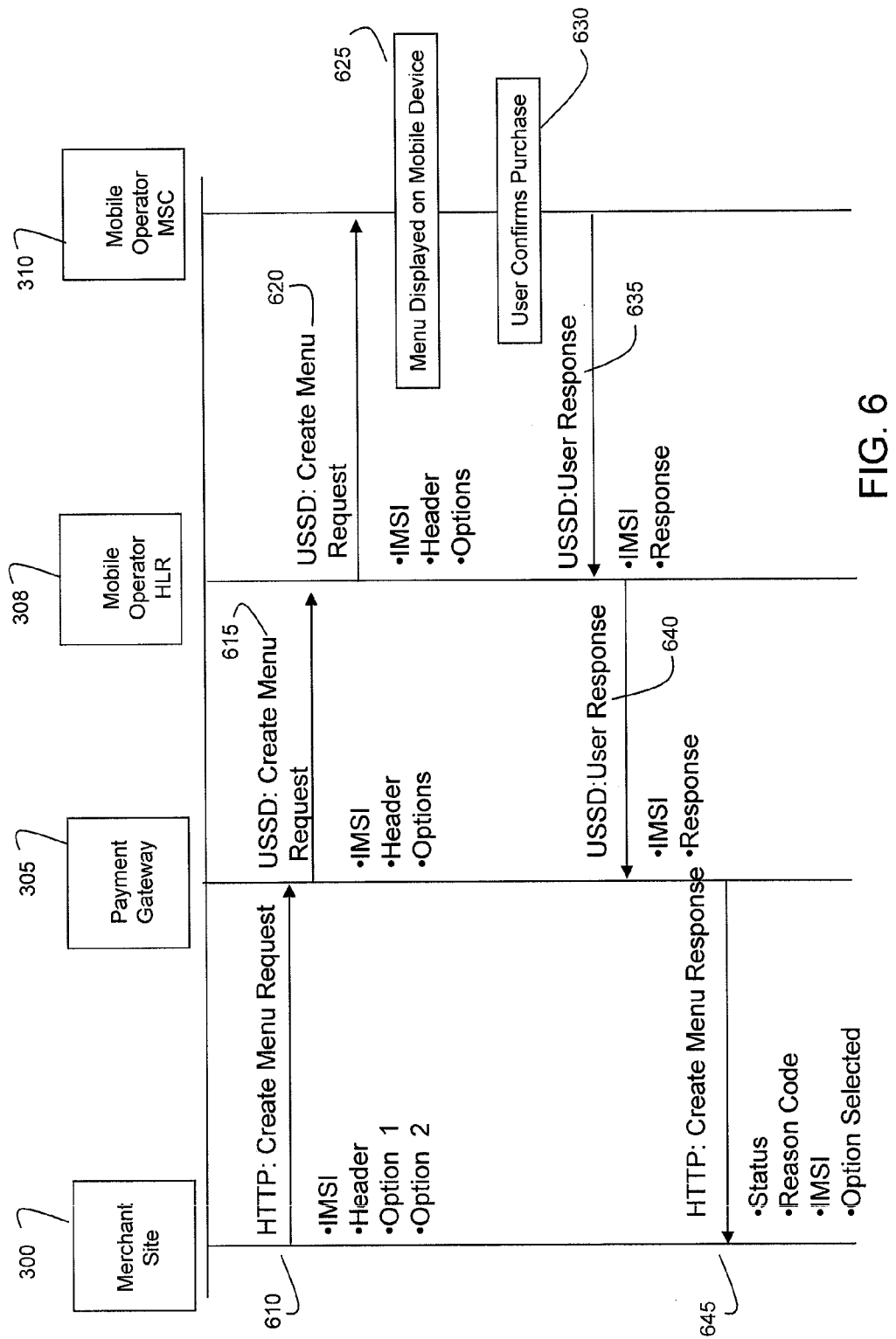
FIG. 6 illustrates one embodiment of creating menus on the mobile device involving the Payment Gateway.

One such embodiment of confirming the charge is shown in FIG. 6. FIG. 6 illustrates that a merchant can request that a menu be displayed on the wireless users' mobile phone. The wireless operator causes the menu to be displayed on the mobile device, and the menu typically includes a menu selection for confirming a charge. If the user confirms the charge, the response is provided back to the wireless operator, which in turn, confirms the user's acknowledgement to the merchant. In this manner, a user that did not actually originate a purchase transaction would receive the menu display and likely decline the charge (or at least would not confirm it). If the user in unaware of the menu display requesting confirmation, and is not able to respond, then the wireless operator will treat an absence of a response as if the user declined.

The steps are shown in FIG. 6 with the merchant site 300 initiating a HTTP message 610 requesting a menu to be created. The information includes the IMSI to identify which mobile user should receive the menu display and the contents of the display. The message may comprise a header (e.g., "Please confirm the following charge of $1.00 to your account") with various options ("Press 1 to accept" and "Press 2 to decline.") Other information may include the amount of the charge, the merchant's name, goods purchased, etc.

The gateway 305 receives the HTTP request, generates a USSD Create Menu Request message 615 to the wireless provider's HLR. The message is structured as required by the mobile operator 308 for indicating the function and addressed using conventional SS7 addressing techniques. The USSD message may include the header and options as indicated by the merchant site. The gateway may use the aforementioned lookup table to determine the appropriate syntax used by this particular wireless carrier.

The wireless provider's HLR will then communicate this information in another message, shown here as another USSD message 620, which is sent to the serving mobile switching center (MSC) 310. The MSC then transmits the signaling information causing the display to be generated on the wireless user's device at step 625. The user is presumed to confirm the charge in step 630. This response is sent by to the serving MSC, and the MSC provides the response in a USSD message 635 which indicates the IMSI and the selected response back to the HLR 308. The HLR transmits a USSD User Response message 640 back to the gateway 305. The gateway, in turn, initiates an HTTP message 645 to the merchant site 300, which provide various parameters regarding the user's request and the charge status. The parameters may indicate the status, reason code, IMSI, and option selected by the user.

Wireless User Registration

In many embodiments, the wireless user must register before charges to their wireless account (and therefore purchases) can be completed.

Figure 7:
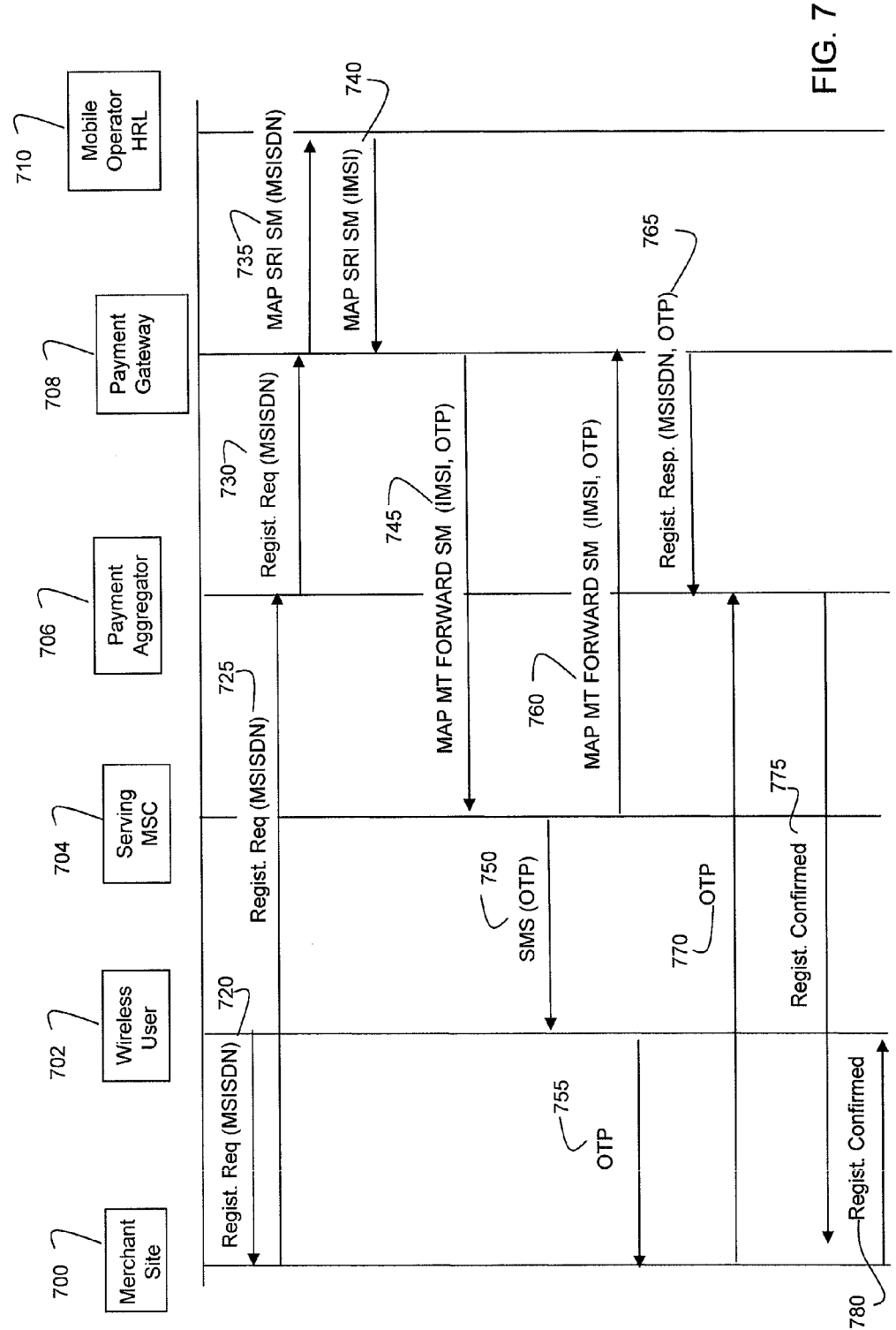
FIG. 7 illustrates one embodiment of registration procedures involving a Payment Gateway.

FIG. 7 illustrates one embodiment of the registration process messaging flows. In this diagram, the merchant site 700 is shown as interacting with the wireless user 702 and with a payment aggregator 706. The serving MSC 704 is also shown as interacting with the wireless user 702 and the Payment Gateway 708. The gateway also interacts with the payment aggregator 706. Finally, the gateway also interacts with the mobile operator's HLR 710.

The process begins in step 720 with the wireless user 702 requesting registration with the merchant. This may occur using a mobile browser or other such method known in the art. The wireless user conveys the mobile telephone number (MSISDN) to the merchant's site. The merchant site communicates with the payment aggregator using an HTTP based formatted message 725 to register the user as identified by MSISDN. The payment aggregator, in turn requests registration by the gateway 708 using message 730. This message 730 also may be formatted using HTTP.

The gateway obtains the IMSI of the user by sending a MAP based short message ("MAP-SEND-ROUTING-INFO-FOR-SM") 735 with the MSISDN as a parameter. This message is used to obtain the IMSI (or the Mobile Country Code ("MCC") and Mobile Network Code ("MNC")) serving the wireless user which is conveyed by message 740 as well as the address of the current serving MSC. The gateway now knows the IMSI and can send an SMS message (MT Forward SM) 745 directed to the mobile user by addressing the serving MSC. Further, the SMS message indicates a one-time-password (OTP). The OTP can be formatted based on rules defined by the gateway, but it is typically a unique value relative to other assigned OTP values. The OTP value is delivered in message 750 from the serving MSC to the wireless user 702, where it is displayed on the phone. The message typically also includes instructions, requesting the user to enter the indicated code at the merchant's website. The serving MSC 704 confirms the sending of the message to the gateway in message 760. The gateway upon confirmation then forwards the OTP value to the payment aggregator. Thus, the gateway has selected an OTP value and communicated it both to the wireless user and the payment aggregator.

The next steps involve the user entering the OTP code at the merchant's web site, when it then sends it to the payment aggregator for comparison. Specifically, after the user receives the OTP code and responds by providing it to the merchant's website in step 755, the website then sends the OTP value in message 770 using an HTTP message to the payment aggregator. At this point, the payment aggregator has received the allocated OTP from the gateway as well as from the wireless user via the merchant. If the two values match, then it is presumed by the payment aggregator that the proper wireless user has requested and confirmed that they want to register. The payment aggregator can confirm the registration to the merchant using an HTTP response message 775, which is confirmed by the merchant to the wireless user in message 780.

If the two received OTP values do not match, or there is no response, appropriate error procedures can be invoked. Further, various error handling messages may include the same parameters as previously discussed, including reason codes detailing any abnormal procedures.

Settlements

The proceeding describes how a user can effectively purchase an item by having a charge made to their pre-paid account. The merchant upon receiving confirmation that an appropriate charge was made confirms the purchase with the user based on a subsequent settlement with the mobile operator. On a periodic basis, the merchant, Payment Gateway, or mobile operator can request or initiate the transfer of funds associated with accrued transactions. These procedures are separate from the above identified transaction processing procedures.

Alternative Message Flows

Variations on the message flows from FIGS. 2-7 are possible. In one variation, the mobile Payment Gateway does not receive a separate Lookup Request as shown in FIG. 3. Specifically, the merchant site may request an action based on indicating the MSISDN of the user. This is illustrated in FIG. 9.

Figure 9:
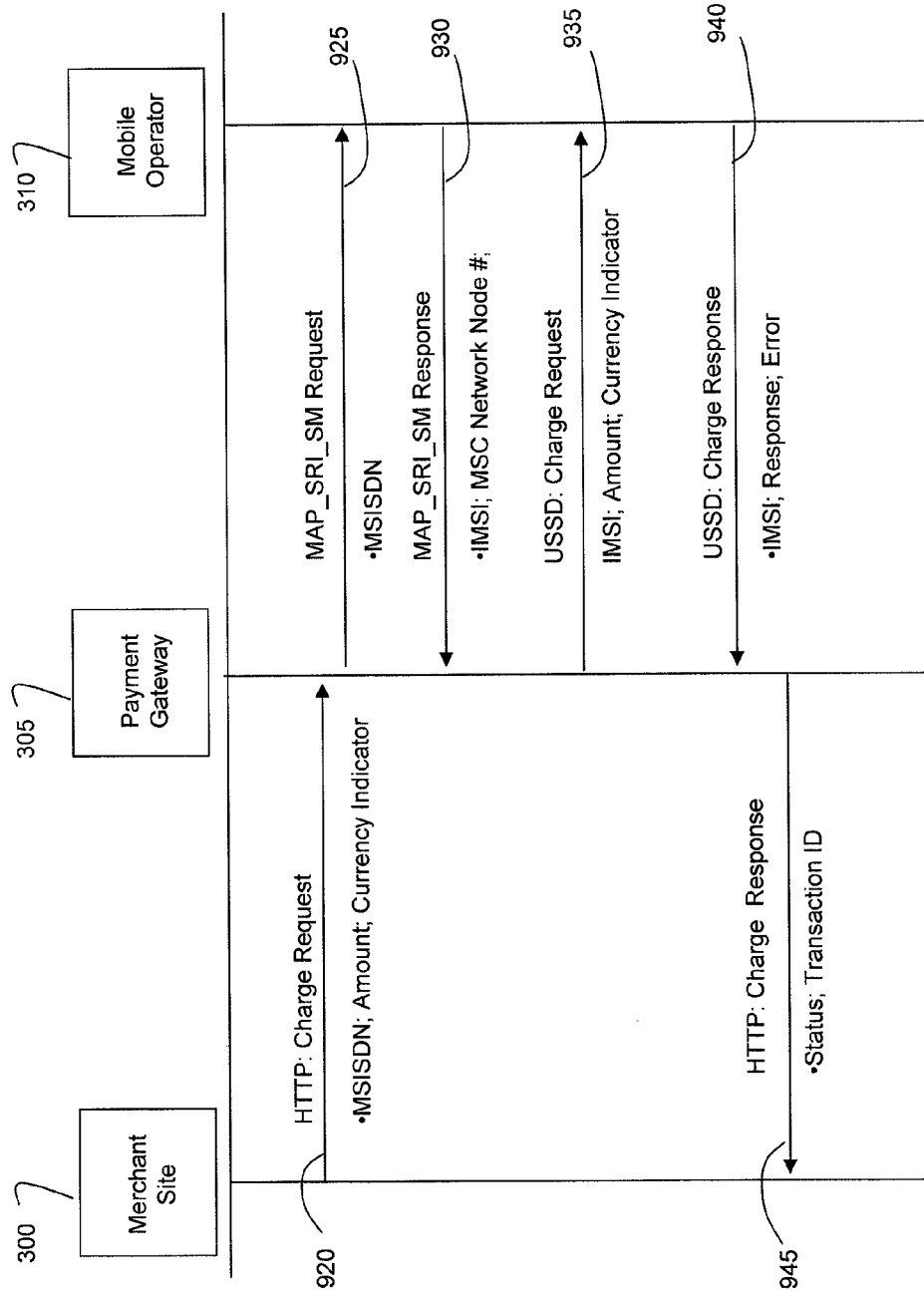
FIG. 9 illustrates another embodiment of processing a charge request by the Payment Gateway.

In FIG. 9, the Payment Gateway 305 receives a Charge Request 920 from the merchant site, which includes the MSISDN, not the IMSI. In this embodiment, the merchant site does not initiate a "Lookup Request" but initiates the Charge Request (or other indicated function). The Payment Gateway then launches a MAP-SEND-ROUTING-INFO-FOR-SM Request message 925 and receives in response the IMSI in the MAP-SEND-ROUTING-INFO-FOR-SM Response message 930. Then the Payment Gateway initiates the USSD based Charge Request message 935 and receives in response the USSD based Charge Response message 940. The Payment Gateway then forwards the Charge Response information 945 to the merchant site. The transaction ID in message 945 can be a variety of values that are used to correlate the response, including the ISMI, the MSISDN, or some other value. In this embodiment, the Payment Gateway relieves the merchant site from having to first request the IMSI by indicating the MSISDN, and the initiating a separate charge request using the IMSI. In this case, the Payment Gateway saves the merchant site from having to make two distinct queries and can thus potentially result in faster overall processing of the request. A similar message diagram is possible for the Balance Request and other functions.

Payment Gateway Architecture

Figure 8:
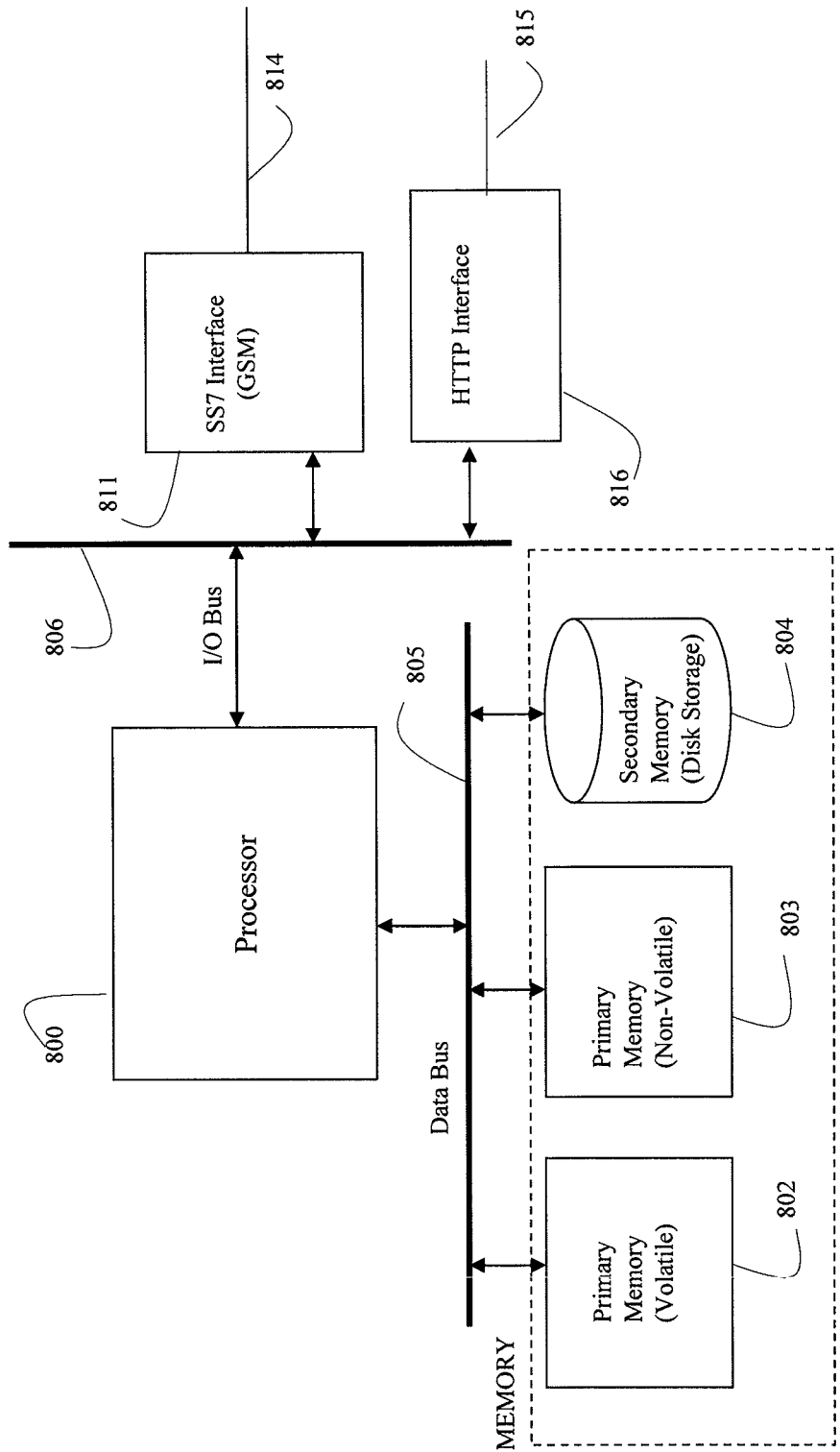
FIG. 8 illustrates one embodiment of the Payment Gateway architecture.

The Payment Gateway can be implemented using various types of computer-based processing systems, which is programmed to perform the sequence of steps previously discussed. One embodiment of the gateway system is shown in FIG. 8. In FIG. 8, a processor 800 is used to execute programming steps, where the programming steps may be stored in primary memory 802. The primary memory can be implemented using various forms of solid state memory, such as RAM. The processor can also temporarily store other variable or information needed in RAM and communicate the contents using data bus 805. The Processor can also access non-volatile memory 803, which also may be used to store programming information. A secondary storage memory, such as a disk storage component or system 804 can also be used. Typically, in logging transaction or messages, such information is stored in disk storage.

The processor also communicates via an I/O bus 806 which interface 811 and interface 816. These provide an interface to SS7 communication facilities 814 and the Internet facilities 815 via an HTTP interface 816. Thus, the mobile gateway sends and receives HTTP based messages to/from the payment aggregator or merchant site via the HTTP interface 816, and sends and receives USSD messages using the SS7 interface 811. The protocol and messaging requirements vary from SS7 and HTTP, the use of different interfaces facilitates implementation. Other implementations may use a common interface for this purpose.

Various embodiments may utilize additional processors, such as a dedicated processor in the SS7 interface to parse and format information according to the SS7 MAP protocols, as well as additional processors in the HTTP interface to parse and format information according to the HTTP protocols. Further, other variations may use other processing configurations, including multiple parallel processing architectures, various application specific integrated circuits (ASICs), digital microcontrollers, etc.

That which is claimed:

1. A gateway system for processing payment related requests associated with a wireless user comprising:
    a processor configured to perform the steps of:
        receive at a first interface from a source a first charge request message requesting a charge operation to an account associated with a wireless user, said first charge request message comprising a first Hypertext Transfer Protocol formatted message comprising an identifier associated with said wireless user and a charge amount;
        generate at a second interface to a mobile operator a first Global System for Mobile Communications based request message comprising a first Unstructured Supplementary Service Data message requesting said charge operation and indicating said charge amount, said first Global System for Mobile Communications based request message comprising an International Mobile Subscriber Identity associated with said wireless user, wherein said mobile operator carries out said charge operation to said account for said charge amount;
        receive at said second interface a first Global System for Mobile Communications based response message comprising a second Unstructured Supplementary Service Data message received in response to said first Global System for Mobile Communications based request message, wherein said first Global System for Mobile Communications based response message confirms said charge operation to said account by said mobile operator; and
        generate at said first interface a first charge response message to said source comprising a second Hypertext Transfer Protocol formatted message confirming said charge operation to said account by said mobile operator.

2. The system of claim 1 further comprising:
    a memory, wherein said memory is configured to store a data string associated with said mobile operator of said wireless user, said data string defined as indicating said charge operation to said mobile operator, said memory providing said data string to said processor for incorporation into said first Global System for Mobile Communications based request message.

3. The system of claim 2 wherein said processor is further configured to perform, prior to receiving said first charge request message, the step of:
    receive at said first interface a second request message from said source comprising a third Hypertext Transfer Protocol formatted message, wherein said second request message comprises a mobile telephone number of said wireless user.

4. The system of claim 3 wherein said processor is further configured to perform the steps of:
    generate at said second interface a first Global System for Mobile Communications based International Mobile Subscriber Identity request message comprising said mobile telephone number to said mobile operator of the wireless user wherein said first Global System for Mobile Communications based International Mobile Subscriber Identity request message requests said International Mobile Subscriber Identity of said wireless user; and
    receive at said second interface a first Global System for Mobile Communications based response message comprising said International Mobile Subscriber Identity of said wireless user.

5. The system of claim 1 wherein said processor is further configured to:
    receive at said first interface a Hypertext Transfer Protocol formatted balance request message from said source, said Hypertext Transfer Protocol formatted balance request message indicating said International Mobile Subscriber Identity or a Mobile Subscriber Integrated Services Digital Network;
    generate at said second interface to said mobile operator a Global System for Mobile Communications based Unstructured Supplementary Service Data message conveying a balance request to said mobile operator, wherein said Global System for Mobile Communications based Unstructured Supplementary Service Data message indicates said International Mobile Subscriber Identity;
    receive at said second interface a Global System for Mobile Communications based Unstructured Supplementary Service Data message from said mobile operator indicating a balance of said account associated with said wireless user; and generate at said first interface a Hypertext Transfer Protocol formatted balance response message to said source indicating said balance and said International Mobile Subscriber Identity or Mobile Subscriber Integrated Services Digital Network.

6. The system of claim 1 wherein said processor is further configured to:
receive a create-menu request message from said source at said first interface to generate a menu on said mobile device of said user, wherein said create-menu request message comprises a plurality of options available to said wireless user regarding a purchase; and
generate an Unstructured Supplementary Service Data based create-menu request message to said mobile operator, wherein said create-menu request message comprising said plurality of options;
receive an Unstructured Supplementary Service Data based create-menu response message comprising one of said plurality of options; and
generate a create-menu response message on said first interface to said source where said create-menu response comprises one of said plurality of options.

7. The system of claim 1 wherein said identifier associated with said wireless user comprises a mobile telephone number.

8. A method for processing payment related requests associated with a wireless user comprising the steps of:
receiving at a processor from a first interface from a source a first charge request message requesting a charge operation to an account associated with a wireless user, said first charge request message comprising a first Hypertext Transfer Protocol formatted message comprising both an identifier associated with said wireless user and a charge amount;
generating by said processor at a second interface to a mobile operator a first Global System for Mobile Communications based request message comprising a first Unstructured Supplementary Service Data message requesting said charge operation and indicating said charge amount, said first Global System for Mobile Communications based request message comprising an International Mobile Subscriber Identity associated with said wireless user, wherein said mobile operator carries out said charge operation to said account for said charge amount;
receiving by said processor at said second interface a first Global System for Mobile Communications based response message comprising a second Unstructured Supplementary Service Data message received in response to said first Global System for Mobile Communications based request message, wherein said first Global System for Mobile Communications based response message confirms said charge operation to said account by said mobile operator; and
generating by said processor at said first interface a first charge response message to said source comprising a second Hypertext Transfer Protocol formatted message confirming said charge operation to said account by said mobile operator.

9. The method of claim 8 further comprising the step of:
retrieving from a memory by said processor a data string associated with said mobile operator of said wireless user, said data string defined as indicating said charge operation to said mobile operator, wherein said processor incorporates said data string into said first Unstructured Supplementary Service Data message.

10. The method of claim 9 further comprising the step of:
receiving at said processor from said first interface a second request message from said source comprising a third Hypertext Transfer Protocol formatted message, wherein said second request message comprises a mobile telephone number of said wireless user.

11. The method of claim 10 further comprising the steps of:
generating by said processor at said second interface a first Global System for Mobile Communications based request message comprising said mobile telephone number to said mobile operator of the wireless user wherein said first Global System for Mobile Communications based request message requests said International Mobile Subscriber Identity of said wireless user; and
receiving at said processor from said second interface a first Global System for Mobile Communications based response message comprising said International Mobile Subscriber Identity of said wireless user.

12. The method of claim 8 further comprising the steps of:
receiving at said first interface a Hypertext Transfer Protocol formatted balance request message from said source, said Hypertext Transfer Protocol formatted balance request message comprising said International Mobile Subscriber Identity or a Mobile Subscriber Integrated Services Digital Network;
generating at said second interface to said mobile operator a Global System for Mobile Communications based Unstructured Supplementary Service Data message conveying a balance request to said mobile operator, wherein said Global System for Mobile Communications based Unstructured Supplementary Service Data message indicates said International Mobile Subscriber Identity;
receiving at said second interface a Global System for Mobile Communications based Unstructured Supplementary Service Data message from said mobile operator indicating said balance; and
generating at said first interface a Hypertext Transfer Protocol formatted balance response message to said source indicating said balance and an International Mobile Subscriber Identity or Mobile Subscriber Integrated Services Digital Network indicating parameter.

13. The method of claim 8 further comprising the steps of:
receiving a create menu request message from said source at said first interface to generate a menu on said mobile device of said user, wherein said create menu request message comprises a plurality of options available to said wireless user regarding a purchase;
generating an Unstructured Supplementary Service Data based create menu request message to said mobile operator, wherein said create menu request message comprising said plurality of options;
receiving an Unstructured Supplementary Service Data create menu response message comprising one of said plurality of options; and
generating a create menu response message on said first interface to said source where said create menu response comprises one of said plurality of options.

14. The method of claim 8 wherein said an identifier associated with said wireless user comprises a mobile telephone number.

15. A non-transitory computer readable medium comprising instructions for instructing a processor to:
receive from a first interface from a source a first charge request message requesting a charge operation to an account associated with a wireless user, said first charge request message comprising a first Hypertext Transfer Protocol formatted message comprising an identifier associated with said wireless user and a charge amount;

generate at a second interface to a mobile operator a first Global System for Mobile Communications based request message comprising a first Unstructured Supplementary Service Data message requesting said charge operation and said charge amount, said first Global System for Mobile Communications based request message comprising an International Mobile Subscriber Identity associated with said wireless user, wherein said mobile operator carries out said charge operation to said account for said charge amount;

receive at said second interface a first Global System for Mobile Communications based response message comprising a second Unstructured Supplementary Service Data message received in response to said first Global System for Mobile Communications based request message, wherein said first Global System for Mobile Communications based response message confirms said charge operation to said account by said mobile operator; and generate at said first interface a first charge response message to said source comprising a second Hypertext Transfer Protocol formatted message confirming said charge operation to said account by said mobile operator.

16. The non-transitory computer readable medium of claim 15 further comprising instructions for instructing the processor to:

retrieve from a memory a data string associated with said mobile operator of said wireless user, said data string defined as indicating said charge operation to said mobile operator, wherein said processor incorporates said data string into said first Unstructured Supplementary Service Data message.

17. The non-transitory computer readable medium of claim 16 further comprising instructions for instructing the processor to:

receive from said first interface a second request message from said source comprising a third Hypertext Transfer Protocol formatted message, wherein said second request message comprises a mobile telephone number of said wireless user.

18. The non-transitory computer readable medium of claim 17 further comprising instructions for instructing the processor to:

generate by said processor at said second interface a first Global System for Mobile Communications based request message comprising said mobile telephone number to said mobile operator of the wireless user wherein said first Global System for Mobile Communications based request message requests an International Mobile Subscriber Identifier of said wireless user; and receive at said processor from said second interface a first Global System for Mobile Communications based response message comprising said International Mobile Subscriber Identity of said wireless user.

19. The non-transitory computer readable medium of claim 18 further comprising instructions for instructing the processor to:

receive at said first interface a Hypertext Transfer Protocol formatted balance request message from said source, said Hypertext Transfer Protocol formatted balance request message comprising said International Mobile Subscriber Identity or a Mobile Subscriber Integrated Services Digital Network;

generate at said second interface to said mobile operator a Global System for Mobile Communications based Unstructured Supplementary Service Data message indicating a balance request to said mobile operator, wherein said Global System for Mobile Communications based Unstructured Supplementary Service Data message indicates said International Mobile Subscriber Identity;

receive at said second interface a Global System for Mobile Communications based Unstructured Supplementary Service Data message from said mobile operator indicating a balance; and generate at said first interface a Hypertext Transfer Protocol formatted balance response message to said source indicating said balance and said International Mobile Subscriber Identity or said Mobile Subscriber Integrated Services Digital Network.

\* \* \* \* \*